US011092693B2

(12) United States Patent
Ulmer et al.

(10) Patent No.: US 11,092,693 B2
(45) Date of Patent: Aug. 17, 2021

(54) AUTOMATIC EXTERNAL RF GAIN CALIBRATION AND CONTINUOUS JAMMING MEASUREMENT

(71) Applicant: Rockwell Collins, Inc., Cedar Rapids, IA (US)

(72) Inventors: Karl W. Ulmer, Marion, IA (US); Troy V. Mundt, North Liberty, IA (US); Gary L. Bachman, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 218 days.

(21) Appl. No.: 16/519,610

(22) Filed: Jul. 23, 2019

(65) Prior Publication Data
US 2021/0208285 A1    Jul. 8, 2021

(51) Int. Cl.
*G01S 19/23*    (2010.01)
*G01S 19/21*    (2010.01)
*H04B 1/10*    (2006.01)
*H04B 1/18*    (2006.01)

(52) U.S. Cl.
CPC ............ *G01S 19/235* (2013.01); *G01S 19/21* (2013.01); *H04B 1/109* (2013.01); *H04B 1/1027* (2013.01); *H04B 1/18* (2013.01)

(58) Field of Classification Search
CPC ........ G01S 19/235; G01S 19/21; G01S 19/23; G06K 11/006; H04B 1/109; H04B 1/18; H04B 1/1027
See application file for complete search history.

(56) References Cited

U.S. PATENT DOCUMENTS

| 8,227,746 | B2 * | 7/2012 | Koch | G01V 8/005 |
| | | | | 250/252.1 |
| 9,612,342 | B2 * | 4/2017 | Petersen | G01S 19/54 |
| 9,614,560 | B2 * | 4/2017 | Turlikov | H04B 17/21 |
| 9,673,917 | B2 | 6/2017 | Conroy et al. | |

(Continued)

FOREIGN PATENT DOCUMENTS

EP    2326073 A1    5/2011

OTHER PUBLICATIONS

EP Search Report for European Application No. 20187309.8 dated Sep. 12, 2020, 10 pages.

*Primary Examiner* — Gregory C. Issing
(74) *Attorney, Agent, or Firm* — Suiter Swantz pc llo

(57) ABSTRACT

A system and method provide automatic RF path gain calibration independent of RF interference levels to preserve solution trust capabilities. After a system is powered ON, or a new antenna is attached (hot swap), a smart antenna assembly combined with a jammer power estimator within an RF receiver functions to autonomously measure internal gains within the RF path, calibrate the new antenna installation, and thereby measure a level of interference associated with the external environment from that point forward. A controller commands the antenna calibration retrieving antenna details and RF path gain calibration while measuring local jamming at the receiver input. Should the controller determine a level of jamming effectiveness is present, it offers a user a display of the local jamming levels enabling the user accurate theater decision making regarding the accuracy and availability of desirable signal.

15 Claims, 5 Drawing Sheets

(56) References Cited

U.S. PATENT DOCUMENTS

| | | | |
|---|---|---|---|
| 2005/0271133 A1* | 12/2005 | Waxman | H04W 48/16 |
| | | | 375/227 |
| 2012/0176209 A1 | 7/2012 | Villain et al. | |
| 2014/0065982 A1* | 3/2014 | Suh | H01Q 1/243 |
| | | | 455/77 |
| 2014/0065994 A1 | 3/2014 | Young et al. | |
| 2014/0184443 A1 | 7/2014 | Riley et al. | |

* cited by examiner

AUTOMATIC EXTERNAL RF GAIN CALIBRATION AND CONTINUOUS JAMMING MEASUREMENT

BACKGROUND

Modernized Global Positioning System/Global Navigation Satellite System (GPS/GNSS) receiver units (Military and commercial) may be faced with growing threats from both unintentional and intentional Radio Frequency (RF) interference. Without exact information regarding this RF interference, a user may unintentionally rely on inaccurate positioning information.

Unfortunately, antenna installation is physically outside control of the GPS receiver and total effective gain/loss presented to a GPS receiver card edge RF connector is an unknown making impractical any absolute jamming level estimate. Additionally, temperature changes greatly affect gain of the external amplifier in the antenna subsystem as well as cable loss between the antenna and GPS receiver.

Further, handheld receivers may have a "hot swap" installation requirement allowing removal from one installation (e.g., in a vehicle) and immediate installation in a second environment (with an associated different external antenna with unique cable length/loss and external gain characteristics). In an environment free from RF interference, a re-calibration could determine possible system details allowing for one level (likely minimal) of performance. However, rarely is an environment (e.g., military battlefield) free from RF interference and any calibration in this environment would likely be useless.

Thus, the initial calibration would be no longer valid and lack of valid calibration compromises the assured Position, Navigation, and Time (PNT) solution integrity. Furthermore, even if the calibration was successfully performed, any temperature induced variations in the cable and external amplifier would be unknown and may very likely degrade the accuracy of the absolute jamming level measurement.

With no accurate calibration capability, the end user's assured PNT solution is at risk of relying on possible previous "calibration" information that is no longer valid due to one of many possible events including: 1) the manual RF calibration was never performed on the system, or performed in presence of RF interference, 2) the manual RF calibration was performed on the system improperly (inside a building vs. live sky condition), 3) the receiver card is swapped out of the embedded installation and a new calibration was not performed, 4) antenna amplifier partially fails (but still allows signal tracking) resulting in different gain, 5) antenna cable was damaged such that it now exhibits more signal loss (less gain), and 6) New antenna (Hot swap) scenario where the handheld unit is placed in different vehicular mount and RF calibration is not performed.

In a no jamming environment, a onetime RF gain calibration event commanded via user interaction may provide a rough (+/−3 dB) estimate of the total RF gain presented at card edge (the +/−3 dB uncertainty assumes temperature induced gain/loss of an external antenna amplifier and cable can vary widely after calibration). For example, some receiver cards may exhibit internal gain variations over temperature of 4 dB. However, measurement and software compensation algorithms may fail to completely correct the error during operation.

Therefore, a need remains for a system and related method which may overcome these limitations and provide a novel solution to autonomously calibrate a new antenna installation and reliably detect and estimate a level of jamming incident on the antenna for given installation and RF conditions offering critical information to a user at the local installation level.

SUMMARY

In one aspect, embodiments of the inventive concepts disclosed herein are directed to a system for automatic calibration and jamming measurement. The system may comprise a smart antenna assembly including a known noise source, a switch, a gain, a temperature sensor, and an interface cable. The switch may maintain 1) an operational position connecting an antenna signal to the interface cable or 2) a bypass position connecting the known noise source to the interface cable. The antenna signal may be comprised of a desired signal and a jamming signal.

The system may further comprise a Radio Frequency (RF) receiver operatively coupled with the smart antenna assembly via the interface cable, the interface cable having a cable loss, and a jammer power estimator associated with, and operatively coupled with, the RF receiver, the jammer power estimator including a processor operatively coupled with a memory and a known strength test code source.

For RF path gain calibration, the memory may include a tangible, non-transitory memory configured to communicate with the controller, the tangible, non-transitory memory having instructions stored therein that, in response to execution by the controller, cause the controller to sense a power on of the RF receiver and a new antenna, command an identification of the new antenna, determine a temperature gain delta (T) based on a signal from a temperature sensor, and determine an RF path gain calibration, the RF path gain calibration a sum of the gain, the cable loss, and the temperature gain delta (T).

To begin a measurement of a jamming effectiveness, the memory may cause the controller to receive an indication prompting entry into a bypass mode, command the switch to the bypass position, measure and store a known strength test code signal (B) from the known strength test code source in the presence of a known noise power (No) determine a bypass noise floor based on the known strength test code signal, the known noise power signal, and the RF path gain.

The memory may cause the controller to command the switch to the operational position, measure and store a known strength test code signal (B) from the known strength test code source in the presence of a known noise power (No), determine a jamming noise floor based on the known strength test code signal, the jammer power, and the RF path gain calibration. The system may determine a difference between the jamming noise floor and the bypass noise floor, determine a degradation of the desired signal based on the difference, and communicate the degradation of the desired signal to a user display operatively coupled with the RF receiver.

In a further aspect, a method for automatic calibration and jamming measurement may comprise sensing one of: a power up of a RF receiver and a new antenna coupled to the RF receiver and commanding an identification of the new antenna. The identification may include receiving and storing at least one antenna detail including a temperature gain delta (T) based on a signal from a temperature sensor, a gain (Y) associated with the new antenna, and a cable loss (X) between the new antenna and the RF receiver. To determine the net gain, the method may include determining an RF path gain, the RF path gain a sum of the gain (Y), the cable loss (X), and the temperature gain delta (T).

To measure a known noise power, the method may include receiving an indication prompting entry into a bypass mode of the new antenna, commanding a switch associated with the new antenna to a bypass position, and measuring and storing a known strength test code signal (B) from the known strength test code source in the presence of a known noise power (No). The method may include determining a bypass noise floor based on the known strength test code signal (B), the known noise power (No), and the RF path gain.

To enter the operational mode, the method may include commanding the switch to an operational position, measuring and storing the known strength test code signal (B) from the known strength test code source in the presence of a jammer power (Jo) based on a jamming signal, and determining a jamming noise floor based on the known strength test code signal (B), the jammer power (Jo), and the RF path gain. To determine the signal degradation, the method may include determining a difference between the jamming noise floor and the bypass noise floor, determining a degradation of a desired signal associated with the new antenna based on the difference, and displaying the degradation on a user display operatively coupled with the RF receiver.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Figure 1:
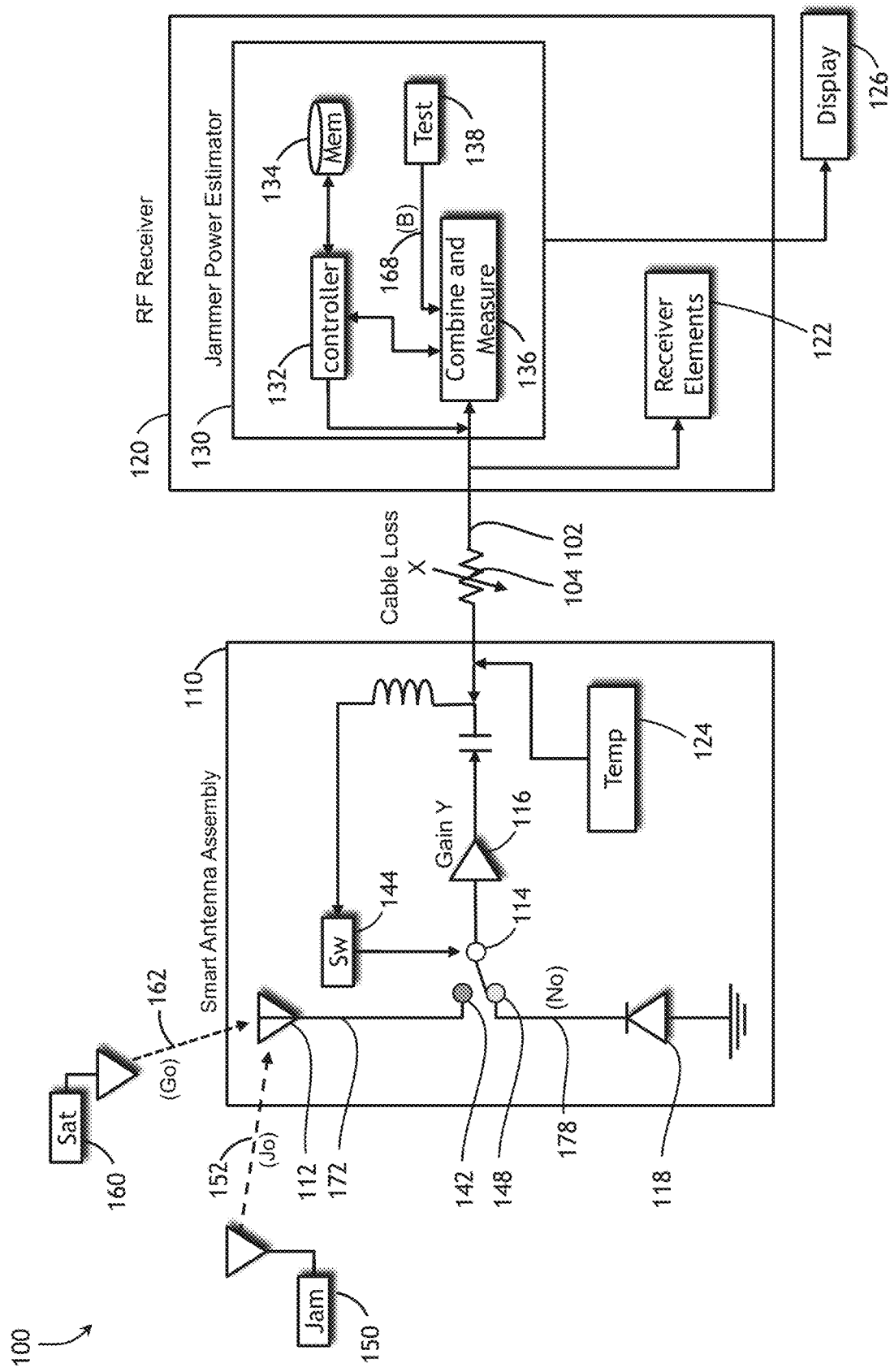
FIG. 1 is a diagram of a system for automatic calibration and jamming measurement in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

OVERVIEW

Broadly, embodiments of the inventive concepts disclosed herein are directed to a system and method provide automatic RF path gain calibration independent of RF interference levels to preserve solution trust capabilities. After a system is powered ON, or a new antenna is attached (hot swap), a smart antenna assembly combined with a jammer power estimator within an RF receiver functions to autonomously measure internal gains within the RF path, calibrate the new antenna installation, and thereby measure a level of interference associated with the external environment from that point forward. A controller commands the antenna calibration retrieving antenna details and RF path gain calibration while measuring local jamming at the receiver input. Should the controller determine a level of jamming effectiveness is present, it offers a user a display of the local jamming levels enabling the user accurate theater decision making regarding the accuracy and availability of desirable signal Generally, one embodiment of the inventive concepts disclosed herein may reliably detect and determine a level of jamming incident on an antenna for given installation and RF conditions. This determination may provide valuable information at the local installation level and also facilitate one of many data points used by a theater commander for formulating a command level 'battle field' assessment of jamming observed by a large array of units spatially dispersed across the battle field. The systems herein may use the jamming level determination as one input to autonomously assess an integrity of the navigation solution, to make decisions regarding a least jammed frequency from which to attempt signal acquisition or reacquisition, and to select the appropriate strategy for detecting signals in jamming conditions. Thus, the jamming determination is needed both before any GNSS signal has been acquired and while tracking GNSS signals.

REFERENCE CHART

| | |
|---|---|
| 100 | System Overview |
| 102 | Interface Cable |
| 104 | Cable Loss (X) |
| 110 | Smart Antenna |
| 112 | Smart Antenna Element |
| 114 | Switch |
| 116 | Gain (Y) |
| 118 | Known Noise Source |
| 120 | RF Receiver |
| 122 | Traditional Receiver Elements |
| 124 | Temperature Sensor |
| 126 | User Display |
| 130 | Jammer Power Estimator |
| 132 | Controller |
| 134 | Memory |
| 136 | Combiner |
| 138 | Known Test Signal (B) Source |
| 140 | GNSS Satellite |
| 142 | Operation Mode Position |
| 144 | Switch Initiator |
| 148 | Bypass Position |
| 150 | Jammer |
| 152 | Jammer Signal |
| 158 | Known Noise Signal |
| 162 | Desired Signal |
| 168 | Known Test Code Signal (B) |
| 172 | Antenna Signal |
| 212 | Traditional Antenna |
| 218 | Manual Calibration UI |
| 224 | Temperature Gain Delta (T) |
| 252 | Unknown Jammer Power (Jo) |
| 258 | Known Noise Power (No) |
| 262 | Desired Power (Go) |
| 300 | Logic Flow |
| 302 | Power Up? |
| 304 | Command Bypass Mode |
| 306 | Command Antenna Details |
| 308 | Receive and Store Details |
| 310 | Determine RF Gain Path Calibration |
| 312 | Receive and Store No and B |
| 314 | Command Operational Mode |
| 316 | Receive and Store Jo and B |
| 318 | Combine and Measure |
| 320 | Determine Degradation |
| 322 | Display Degradation |
| 324 | New Antenna? |
| 326 | Active Acquisition or Tracking? |
| 328 | Receive Desired Signal |
| 330 | Manual Calibration |
| 400 | Method Flow |
| 402 | Sense New Antenna |
| 404 | Command ID |

REFERENCE CHART -continued

| | |
|---|---|
| 406 | Receive and Store Ant. Details |
| 408 | Determine RF Path Gain Cal. |
| 410 | Receive Bypass Indication |
| 412 | Command Bypass Mode |
| 414 | Measure Store No |
| 416 | Measure Store B |
| 418 | Determine Bypass Noise Floor |
| 420 | Command Operational Mode |
| 422 | Measure Store B |
| 424 | Measure Store Jo |
| 426 | Determine Jamming Noise Floor |
| 428 | Determine Difference |
| 430 | Determine Degradation |
| 432 | Display Degradation |

FIG. 1 Smart Antenna

Referring now to FIG. 1, a diagram of a system for automatic calibration and jamming measurement in accordance with an embodiment of the inventive concepts disclosed herein is shown. Generally, an overview of the system 100 may comprise a smart antenna assembly 110 operationally coupled with an RF receiver 120. The system 100 may function as a pseudo truth source for how much a desired signal (e.g. GPS) may degrade based on local jamming effectiveness. Based on this degradation, a decision maker may make accurate decisions based on the effectiveness of known jamming.

a. Smart Antenna Assembly

The smart antenna assembly 110 may be configured for reception of a plurality of RF signals. In some embodiments, smart antenna assembly 110 may be configured with a smart antenna element 112 specifically configured to receive a GNSS signal 162 from a GNSS satellite 160. Unfortunately, the smart antenna assembly 110 may be susceptible to a jamming signal 152 produced by a jammer 150. The system 100 may include the smart antenna assembly 110 while the RF receiver 120 may be modernized with interface capabilities necessary to communicate and control the smart antenna assembly 110. In autonomous calibration of an RF gain path between the smart antenna assembly 110 and the RF receiver 120, the system 100 may support a high integrity assured PNT operation in all operational environments including the challenging antenna hot-swap scenario.

The smart antenna assembly 110 may be fitted with a gain 116 and a temperature sensor 124. A switch 114 may function as a two-position switch to cycle between an operational position 142 and a bypass position 148. The switch 114 may be directly controlled by a controller 132 within the RF receiver 120 and initiated by an optional switch initiator 144 within the smart antenna assembly 110. The switch 114 may be biased to the operational position 142 meaning when a signal from the controller 132 is absent, the switch 114 may revert to the operational position 142.

While in the operational position 142 the smart antenna assembly 110 may produce an antenna signal 172 received by the smart antenna element 112 and output to an interface cable 102. While in the bypass position, a known noise power source 118 may provide the smart antenna assembly 110 with known noise signal 178 to output to the RF receiver 120 via the interface cable 102.

External to the smart antenna assembly 110, a desired signal 162 may arrive from any source. In one embodiment, the desired signal may emanate from a GNSS satellite 160 providing a plurality of data over an RF carrier desired signal 162.

The smart antenna assembly 110 may also function to detecting an activation event and communicating data to the RF receiver. The smart antenna assembly 110 may also function as a precisely calibrated noise power level device and pre-amplifier with data from the temperature sensor 124 and communicate the temperature gain delta (T) 224 information to compensate for gain variations. The known noise power source 118 may function to simulate a non-jamming environment.

In one embodiment of the inventive concepts disclosed herein, the smart antenna assembly 110 may be compatible with a traditional RF receiver without the corresponding jammer power estimator 130. Here, the switch 114 may be permanently in the operational position 142 and function of the smart antenna assembly 110 may be limited. The smart antenna assembly 110 may include an antenna associated external to the smart antenna assembly (e.g., a traditional antenna) or incorporated within the smart antenna assembly.

b. RF Receiver

The RF receiver 120 may also be specifically configured to receive and process a GNSS signal. Contemplated herein, the RF receiver 120 may be configured to receive any RF signal. Here, traditional receiver elements 122 may be specifically configured to receive a GNSS signal tracked by the smart antenna element 112. These tracking channels may enable the traditional receiver elements 122 to track a specific signal (e.g., a GPS signal). The controller 132 may command a track channel to receive an input from the internally generated signals while in the bypass mode, and also track and generate positioning data while in the operational mode.

c. Jammer Power Estimator

In one embodiment of the inventive concepts disclosed herein, the RF receiver 120 may include a jammer power estimator 130. The jammer power estimator 130 may include the controller 132 operatively coupled with a memory 134, a known test signal source 138 configured to produce a known test signal (B) 168. A combiner 136 operatively coupled with each of the controller 132, the known test signal source 138, and the interface cable 102. The combiner 136 may function to measure a noise floor power at the interface cable 102 input. A display 126 operatively coupled with the jammer power estimator 130 may provide a user with a display of a result of a degradation of the desired signal.

d. Interface

In one embodiment of the inventive concepts disclosed herein, the interface cable may be comprised of a low data rate serial communication connection over the interface cable 102. In another embodiment, the jammer power estimator 130 may be comprised of the controller 132 and memory 134 for many operations. The controller 132 may command the identification of the new antenna a response of an antenna part number, an antenna model, an antenna temperature, and a temperature versus a gain profile.

However, the jammer power estimator 130 may be much more simplified in construction wherein the controller 132 may produce an increase in voltage (e.g., 5V) across the interface cable 102 exciting a simple voltage level indicator within the switch initiator 144 functional to command the switch 114 to the bypass position 148 or operational position 142. For example, the interface cable 102 comprised of a coaxial cable may provide connectivity within a specific configuration of the smart antenna assembly 110. An increase in voltage level on the coaxial version of the interface cable 102 as well as within a center conductor of the coaxial cable may command the smart antenna assembly 110 to enter the bypass mode via the bypass position 148. Also, the controller 132 may employ an alternative signaling scheme to cause the switch 114 to change positions. In one embodiment, a transmission of a voltage signature including an increase or a voltage decrease may cause the switch 114 to move while another embodiment may include a short pulse increase or decrease over the center conductor to cause the switch to change positions. In another embodiment, the system 100 may employ a Frequency Division Multiplexing technique to transmit data as well as power over a simple coaxial conductor.

The controller 132 may also employ a number of events also to cause the switch 114 to revert from the bypass position to the operational position. An opposite occurrence of the event (voltage increase, pulse, etc.) causing the switch to move may also cause the switch to revert to the operational position. Also, a predetermined lapse of time may cause the switch 114 to revert to the operational position 142. Regardless of the cause, the smart antenna assembly 110 may revert to the operational mode via the operational position 142.

In one embodiment of the inventive concepts disclosed herein, the system 100 may function with an existing wiring configuration by attaching the smart antenna assembly 110 at a first end of the existing wiring and the RF receiver 120 configured with the jammer power estimator 130 to a second end of the existing wiring. In this manner, an existing GPS/GNSS wiring may find useful function when used with the system 100.

FIG. 2 Function

Figure 2:
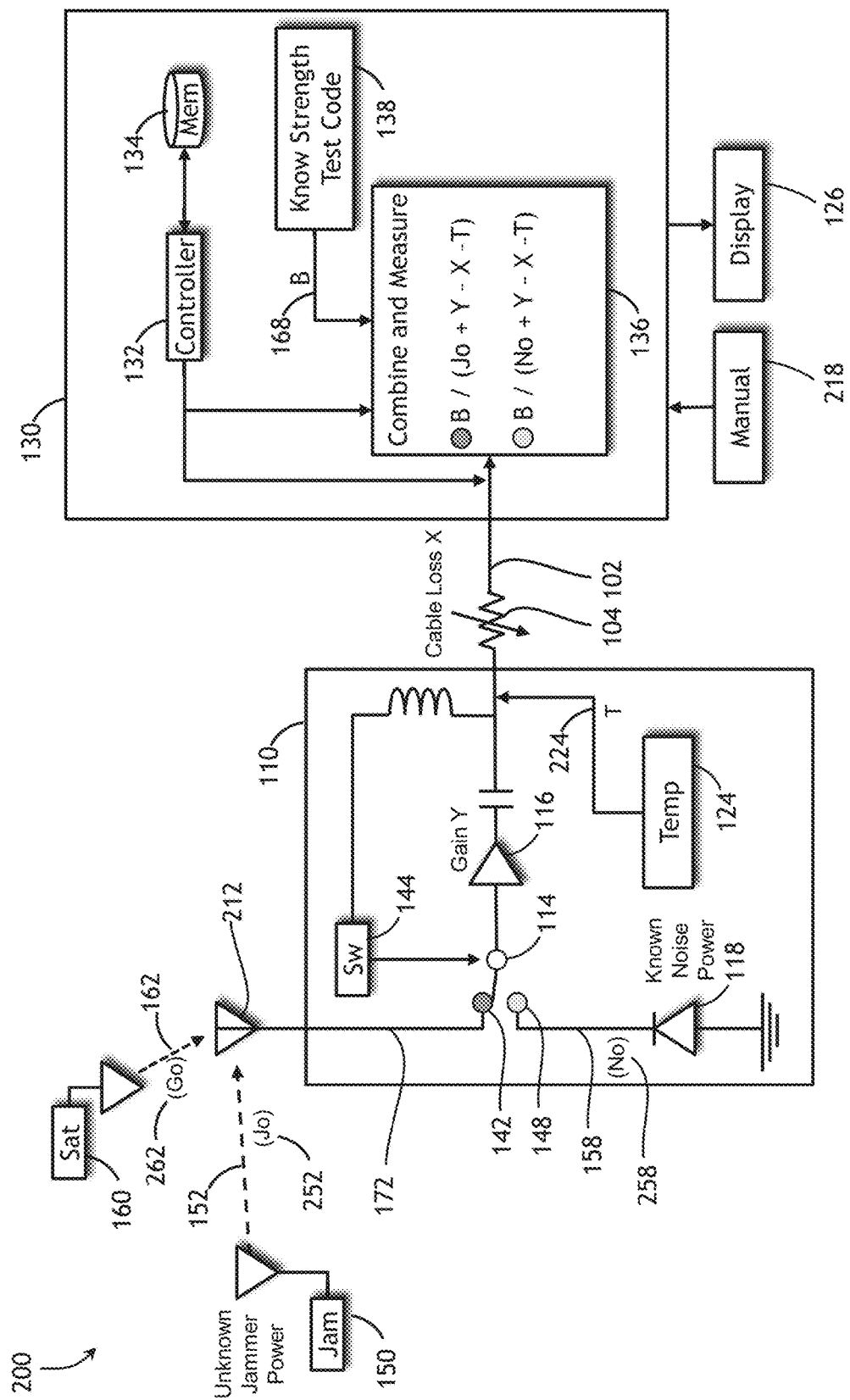
FIG. 2 is a diagram of a smart antenna element and jammer power estimator in accordance with an embodiment of the inventive concepts disclosed herein.

Referring now to FIG. 2, a diagram of a smart antenna element and jammer power estimator in accordance with an embodiment of the inventive concepts disclosed herein is shown. A detail diagram 200 may indicate elements associated with a function of the system 100.

e. System Function

In some embodiments, the smart antenna assembly 110 may be backward compatible with a traditional antenna 212 mounted externally to the smart antenna assembly 110 but operatively coupled thereto. The smart antenna assembly 110 may recognize an installation of the new traditional antenna 212 and take action based on the hot swap scenario.

f. Bypass Mode

In one embodiment of the inventive concepts disclosed herein, the controller may command a bypass mode by commanding the switch 114 to the bypass position 148. The controller may sense a reason to enter the bypass mode or be manually commanded by the user to do so. The controller 132 may sense a power up of the RF receiver 120, an installation of a new antenna coupled to the RF receiver 120, and a user-initiated entry into the bypass mode. In one embodiment of the inventive concepts disclosed herein, the controller may receive an indication prompting entry into the bypass mode. The controller 132 may sense an installation of a new traditional antenna 212 causing the controller 132 to command the bypass mode. In another, should the RF receiver 120 enter active acquisition or a track mode, the controller 132 may automatically command the bypass mode. Also, the user may manually command the controller 132 to enter the bypass mode via activation of the manual calibration user interface 218.

In one embodiment of the inventive concepts disclosed herein, the system 100 may include an operator initiated manual calibration user interface 218. In a benign live sky RF environment (no jamming), this manual calibration user interface 218 may offer the operator a function to initiate a manual action if the user may question the validity of prior RF path gain calibration. Additionally, the memory 134 may have instructions allowing the controller 132 to determine if the prior RF path gain calibration is valid. For example, should the controller sense an unexpected absence of the desired signal 162, the controller may suspect an invalid RF path gain calibration.

The bypass mode enables the controller 132 to continuously and accurately determine RF jamming levels incident on the smart antenna assembly 110 in subsequent operational environments, while compensating for temperature induced gain delta (T) 224, and also facilitates the detection of faulty antenna installation events for all GNSS operating conditions. The controller 132 may determine the operational RF jamming levels by comparing the noise floor power level of the baseline RF path gain measurement (bypass mode) with the elevated noise floor power level observed during jamming (operational mode). In bypass mode, the controller 132 measures and stores the noise floor (e.g., jamming level) estimates without having tracked any GNSS signals by utilizing calibration test code signals 168 internally generated by the RF receiver. The carrier to noise ratio C/No is measured by tracking these internally generated calibration test code signals that have been combined with the noise floor observed at the card edge interface cable 102.

g. RF Calibration

In one embodiment of the inventive concepts disclosed herein, the jammer power estimator 130 may function to calibrate the output of the smart antenna assembly 110 to ensure the combiner 136 is reliant on an accurate signal across the interface cable 102. The controller 132 may sense a new traditional antenna 212 attached to the RF receiver 120 via the interface cable 102 and command an identification of the new traditional antenna 212 as well as receive a manual input from the user via activation of a manual calibration user interface 218.

During the bypass mode, the noise floor level presented to the amplifier in the smart antenna assembly 110 may have a known relationship relative to the noise floor that would have been presented if the new traditional antenna 212 was not bypassed and the RF conditions incident on the new traditional antenna 212 were benign. The RF receiver 120 may observe a measurement of this noise floor amplified by the active gain 116 in the smart antenna assembly 110 and attenuated by the length of RF interface cable 102 between the smart antenna assembly 110 and the RF receiver 120. The controller 132 may store this baseline RF path gain measurement along with the new traditional antenna 212 identification and current temperature induced gain delta (T) 224 data provided over the interface cable 102.

The controller 132 may receive and store antenna details including a temperature gain delta (T) 224 based on a signal from a temperature sensor 124, the gain (Y) 116, and the cable loss (X) 104. Since gain may be directly related to temperature, the controller may determine a temperature gain delta (T) 224 based on a signal from a temperature sensor 124. The controller may determine an RF path gain calibration, the RF path gain calibration a sum of the gain (Y) 116 summed with the cable loss (X) 104 and the temperature gain delta (T) 224. For example, the controller 132 may detect a sensed temperature resulting in a temperature gain delta (T) 224 leading to one formula for net antenna installation gain:

$$Y-X+/-T. \quad (1)$$

Here, the temperature sensor 124 at the antenna may function to facilitate an improvement in accuracy of the degradation to the desired signal 162. A change in net gain may be indistinguishable from change in the jamming levels. Thus, if the noise source in the smart antenna assembly 110 and the amplifier in the smart antenna assembly 110 vary in power by temperature, then a desirable data point may include the temperature of the smart antenna assembly 110 during measurements commanded by the controller 132 during each of the bypass mode position 148 and the operational mode position 142 of the switch 114.

Generally, in a suspected jamming environment, the controller 132 may function to measure a plurality of power levels in each of the bypass mode and operational mode at the input edge (interface cable 102) of the jammer power estimator 130 and determine a degradation of the desired signal 162.

h. Bypass Noise Floor

The controller 132 may command the bypass mode via commanding the switch 114 to the bypass position 148. The controller 132 may measure and store a baseline RF path gain when the switch 114, in the bypass position, presenting a precisely controlled noise floor power level inside the smart antenna assembly 110 at a point closest to the new traditional antenna 212, while bypassing the antenna (new traditional or smart) element. The controller 132 may command the combiner 136 to measure and store a known noise power (No) 258 from the known noise signal 158 and the controller may command injection of, instead of a tracking channel above, a known strength test code signal (B) 168 based on the known known strength test code source 138. The jammer power estimator 130 may cooperate with the receiver 120 to simulate a tracking channel and correlate the tracking channel of the known test code signal 168 or an actual GPS signal received via the new traditional antenna 212. The controller 132 may function to measure power levels of each of the signals in the presence of any jamming present in the environment.

Once the measurements are stored, the controller 132 may determine a bypass noise floor based on the known strength test code signal (B) 168 divided by the known noise power (No) 258, and the RF path gain calibration, resulting in one formula:

$$(B/(No+Y-X+/-T). \quad (2)$$

i. Operational Mode

The controller 132 may then function to measure the jamming noise floor by commanding the switch 114 to the operational position 142. In the operational position 142, the flow of RF energy may flow from both the jammer 150 and GNSS satellite 160, though the new traditional antenna 212, and, with the switch 114 in the operational position 142, via the interface cable 102 to the jammer power estimator 130.

j. Jamming Noise Floor

The controller 132 may command the combiner 136 to again measure and store the known strength test code signal (B) 168 from the known strength test code source 138, measure and store a jammer power (Jo) 252 based on the jamming signal 152. Once the measurements are stored, the controller 132 may determine a jamming noise floor based on the known strength test code signal (B) 168 divided by the jammer power (Jo) 252, and the RF path gain calibration resulting in one formula:

$$(B/(Jo+Y-X-T). \tag{3}$$

k. Jamming Effectiveness

To determine the effectiveness of the jamming, the system 100 may use the stored results to determine the anticipated degradation of the desired signal 162. In one embodiment of the inventive concepts disclosed herein, the desired signal 162 may be degraded under jamming conditions and one exemplary range of degradation may extend from 0 dB (no jamming) to approximately 20 dB degradation or greater (significant jamming). The system 100 may be specifically configured for an anticipated degradation of the desired signal 162 with jamming present to be an exemplary 15 dB+/−3 dB, where the 3 dB may be an uncertainty range in the estimate.

The fact that a possible jammer 150 may transmit a jamming signal 152 of much greater power and a power of the desired signal 262. The controller 132 may determine a difference between the jamming noise floor and the bypass noise floor, determine a degradation of the desired signal 162 based on the difference; and communicate the degradation of the desired signal to a user display 126 operatively coupled with the RF receiver.

The controller compares the baseline "expected" bypass noise floor under known noise conditions from the bypass mode to the measured 'real-time' jamming noise floor observed during the operational mode when varying levels of jamming may be present. The controller 132 may determine the difference and use it to determine the absolute jamming levels incident on the new antenna 212. The baseline measurement provides a means of calibrating out the RF gain path in the absence of RF interference such that degradation from the baseline is a direct measure of the effectiveness of the jamming power on the desired signal 162.

The controller 132 function may include 1) activating/deactivating the antenna element bypass switch 114 autonomously to perform a quick RF path gain calibration whenever the system is transitioned to an active signal acquisition or tracking mode 2) communicating basic identification information of the new antenna 212 to controller 132 over the interface cable 102 to facilitate identifying the new antenna 212 and its characteristics and data representing any gain deltas to expect due to temperature changes during operation, 3) provide for backward compatibility with a traditional RF receiver that may not benefit from the smart antenna bypass mode and autonomous calibration capabilities, but still track and perform manual calibrations assuming a benign RF interference condition, 4) accurately measure the noise floor presented to the RF receiver 120 in the baseline antenna element bypass mode, and 5) continuously measure the noise floor presented to the RF receiver 120 input during normal operations and compensate for any temperature induced gain changes.

For example, should the system 100 determine the difference between the jamming noise floor and the bypass noise floor is an exemplary 10 dB. The determined degradation of the desired signal 162 may also be 10 dB. The display 126 may then indicate a warning of an availability of a desired signal due to jamming and a local jamming effectiveness of an exemplary 6 on a scale of 10 to the user as well as a textual indication including a benign jamming level, a moderated jamming level, and an extreme jamming level. These warnings may offer the user an indication of whether the RF receiver 120 may accurately find and rely on the desired signal 162.

The estimated level of jamming as well as the impact on the desired signal may provide battlefield situational awareness via cloud and general jammer present, or excessive jamming present awareness to the user. It may also provide input for the local RF receiver to generate a response to make integrity and availability decisions.

In one embodiment of the inventive concepts disclosed herein, the system 100 may communicate the degradation to a plurality of additional receptors including an additional processor configured for desired signal acquisition. The communication to the plurality of receivers may include displaying the degradation on a user display further, and a modification to a response of the RF receiver to improve a system integrity. In one embodiment of the inventive concepts disclosed herein, the system 100 may be applicable to handheld, ground embedded, vehicular, aviation, and other types of end applications which may utilize Fixed Reception Pattern Antennas (FRPAs).

FIG. 3 Logic Flow

Figure 3:
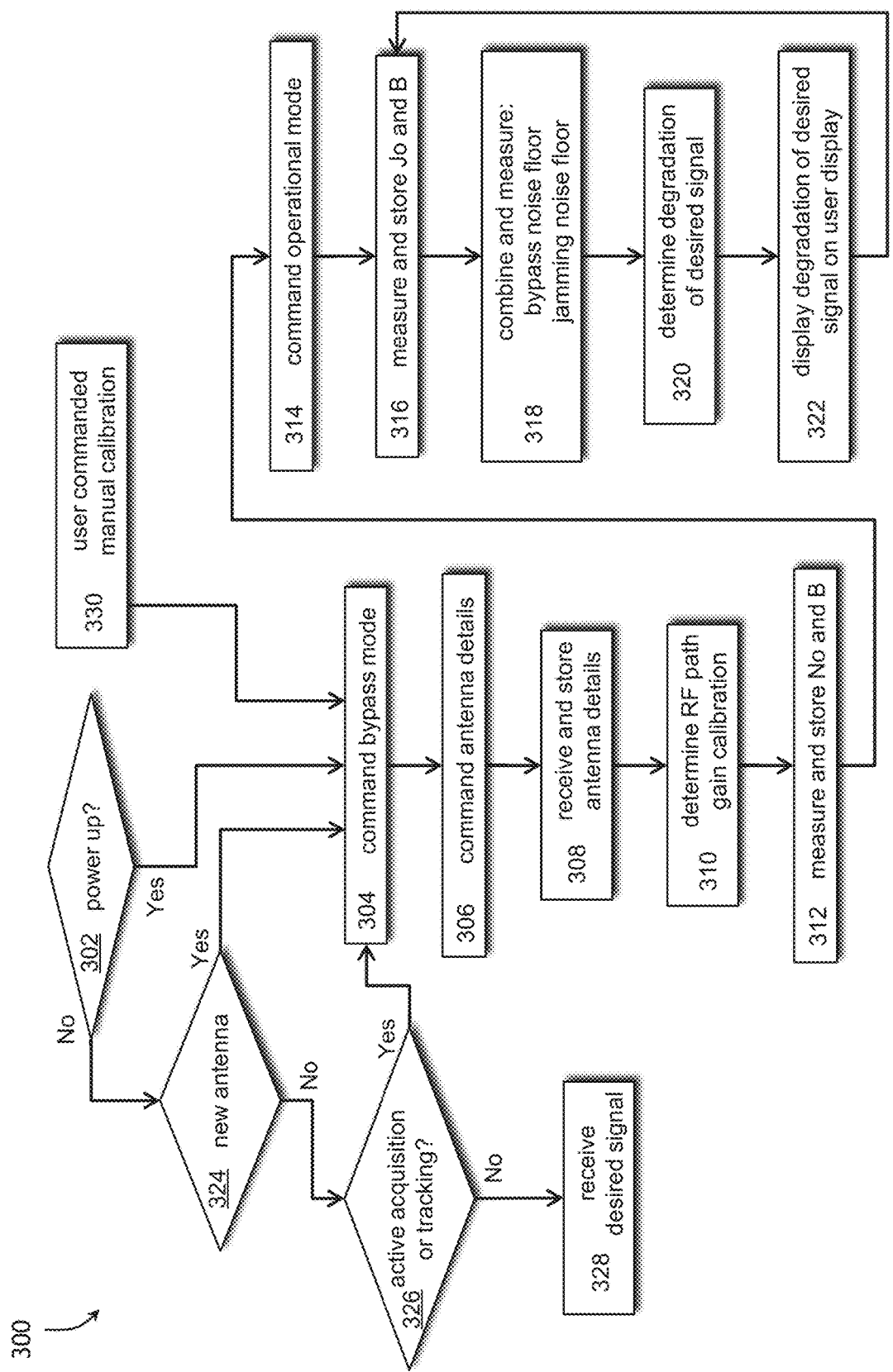
FIG. 3 is a diagram of a logic flow exemplary of an embodiment of the inventive concepts disclosed herein.

Referring now to FIG. 3, a diagram of a logic flow exemplary of an embodiment of the inventive concepts disclosed herein is shown. A query 302 may include a query whether the controller 132 may sense a power up of the RF receiver in the hot swap scenario. A positive result may continue to a step 304 with commanding the bypass mode of the smart antenna assembly 110. A step 306 may command the antenna details from the smart antenna assembly 110 while a step 308 may receive and store the details. Based on the received details, a step 310 may determine the RF path gain calibration. Still in the bypass mode, a step 312 may measure and store the known noise power No 258 and the known test code signal B 168.

To transfer to the operational mode, the controller 132 may command, at a step 314, the operational mode and, at a step 316, may measure and store the jammer power Jo 252 and the known strength test code B 168. A step 318 may combine and measure each of the bypass noise floor and the jamming noise floor while a step 320 may determine a degradation to the desired signal 162. A step 322 may display the degradation of the desired signal on a user display 126.

Should a result of query 302 be negative, the logic may continue to a step 324 with an additional query if the controller 132 may sense an installation of a new antenna. A positive result may continue to the step 304 to enter the bypass mode while a negative result may continue to an additional query 326 if the RF receiver 120 is in active acquisition or a track mode. Should the result of query 326 be positive, the logic may continue to step 304 to enter the bypass mode, if not, the logic may pass to a step 328 with receive the desired signal 162.

FIG. 4 Method

Figure 4A:
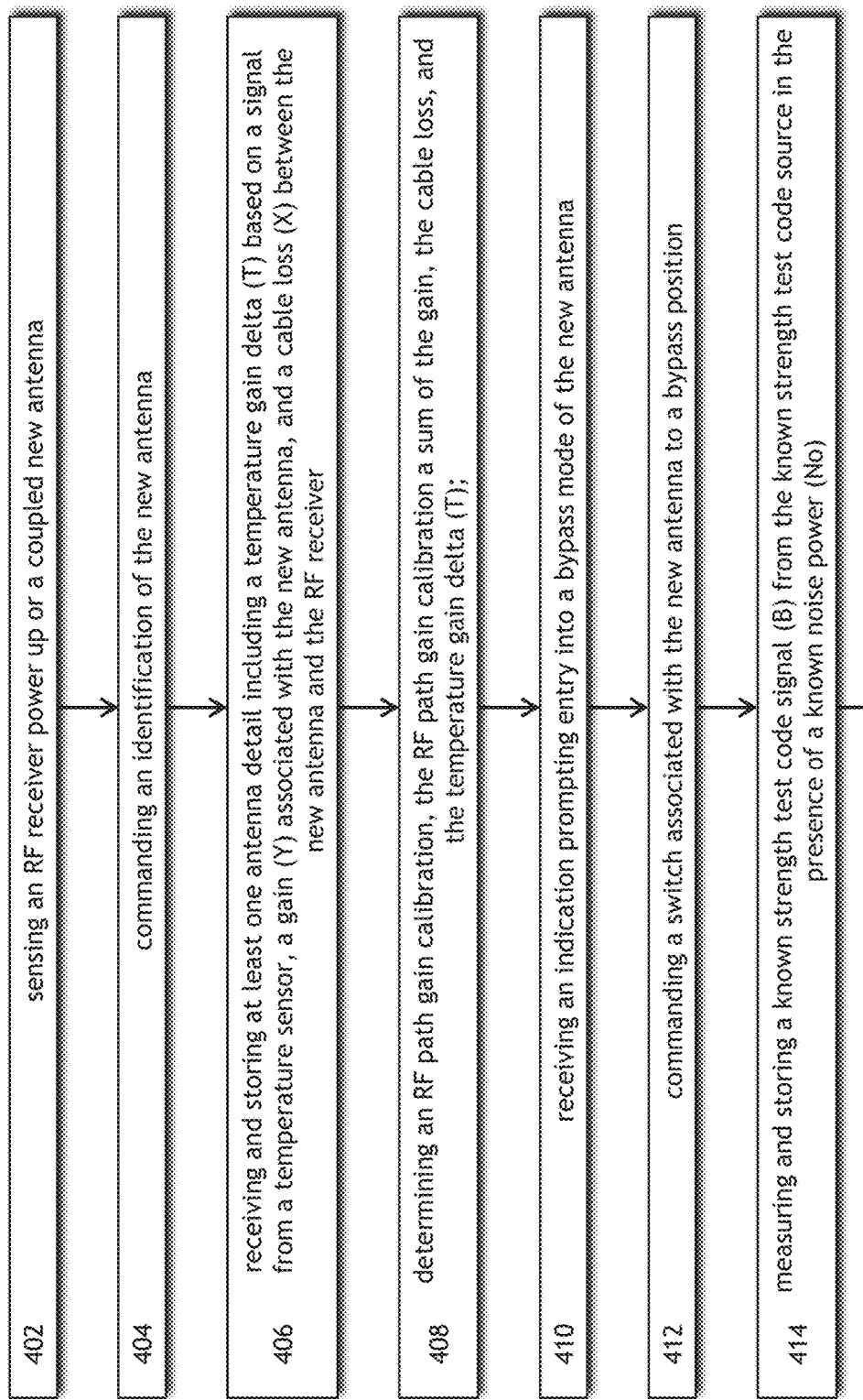
FIGS. 4A and 4B are diagrams of a method flow exemplary of one embodiment of the inventive concepts disclosed herein.
Figure 4B:
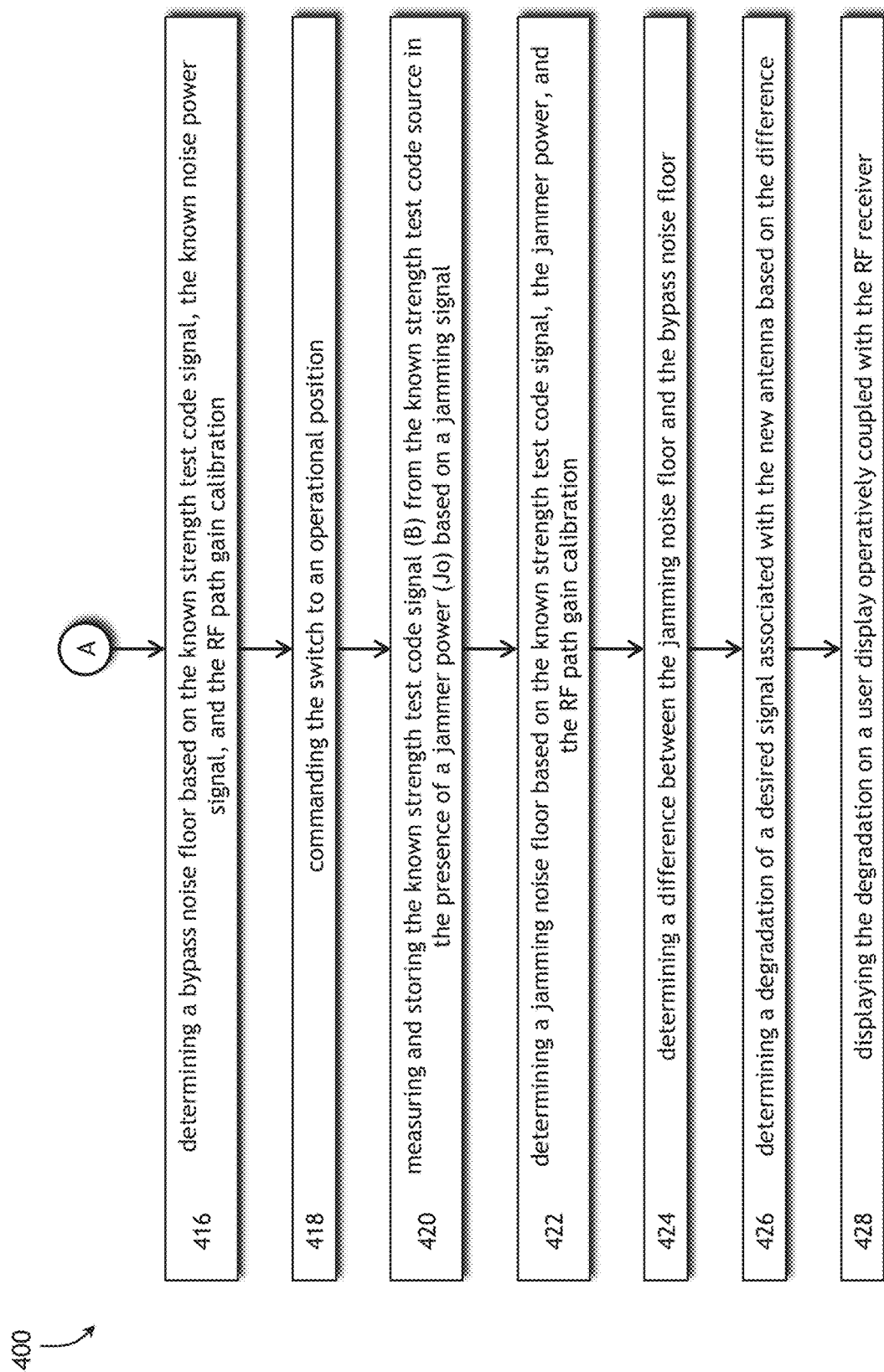

Referring now to FIGS. 4A and 4B, diagrams of a method flow exemplary of one embodiment of the inventive concepts disclosed herein is shown. The method steps 400 may include, at a step 402, sensing a new antenna coupled to a RF receiver and a step 404 may include commanding an identification of the new antenna.

A step 406 may include receiving and storing at least one antenna detail including a temperature gain delta (T) based on a signal from a temperature sensor, a gain (Y) associated with the new antenna, and a cable loss (X) between the new antenna and the RF receiver while a step 408 may include determining an RF path gain calibration, the RF path gain calibration a sum of the gain, the cable loss, and the temperature gain delta (T).

To enter the bypass mode, a step 410 may include receiving an indication prompting entry into a bypass mode of the new antenna and a step 412 may include commanding a switch associated with the new antenna to a bypass position. For bypass measurements, a step 414 may include measuring and storing a known strength test code signal (B) from the known strength test code source in the presence of a known noise power (No). A step 416 may include determining a bypass noise floor based on the known strength test code signal, the known noise power signal, and the RF path gain calibration For operational measurements, a step 418 may include commanding the switch to an operational position, a step 420 may include measuring and storing the known strength test code signal (B) from the known strength test code source in the presence of a jammer power (Jo) based on a jamming signal, and a step 422 may include determining a jamming noise floor based on the known strength test code signal, the jammer power, and the RF path gain calibration. A step 424 may include determining a difference between the jamming noise floor and the bypass noise floor.

For degradation determination, a step 426 may include determining a degradation of a desired signal associated with the new antenna based on the difference and a step 428 may include displaying the degradation on a user display operatively coupled with the RF receiver.

In one embodiment of the inventive concepts disclosed herein, as the system 100 may power up (e.g., once an hour) it may be unaware if a new installation has occurred and may not know if the antenna installation has changed. As the method may progress, the system 100 may inquire antenna details (e.g., ID, part number, etc.) then it may compare the received information to prior installation antenna details and determine if the antenna is new and has changed.

CONCLUSION

As will be appreciated from the above description, embodiments of the inventive concepts disclosed herein may provide a novel solution to autonomously calibrate a new antenna installation and reliably detect and estimate a level of jamming incident on the antenna for given installation and RF conditions offering critical information to a user at the local installation level.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for automatic calibration and jamming measurement, comprising:
   a smart antenna assembly including a known noise source, a switch, a gain, a temperature sensor, and an interface cable;
   the switch having 1) an operational position connecting an antenna signal to the interface cable or 2) a bypass position connecting the known noise source to the interface cable;
   the antenna signal comprised of a desired signal and a jamming signal;
   a Radio Frequency (RF) receiver operatively coupled with the smart antenna assembly via the interface cable, the interface cable having a cable loss; and
   a jammer power estimator associated with, and operatively coupled with, the RF receiver, the jammer power estimator including a controller operatively coupled with a memory and a known strength test code source;
   the memory including a tangible, non-transitory memory configured to communicate with the controller, the tangible, non-transitory memory having instructions stored therein that, in response to execution by the controller, cause the controller to:
   sense one of: a power on of the RF receiver and a new antenna;
   command an identification of the new antenna;
   receive and store at least one antenna detail including a temperature gain delta (T) based on a signal from the temperature sensor, the gain (Y), and the cable loss (X);
   determine a RF path gain calibration, the RF path gain calibration a sum of the gain (Y), the cable loss (X), and the temperature gain delta;
   receive an indication prompting entry into a bypass mode;
   command the switch to the bypass position;
   measure and store a known strength test code signal (B) from the known strength test code source in a presence of a known noise power (No) from the known noise source;
   determine a bypass noise floor based on the known strength test code signal divided by a sum of the known noise power signal and the RF path gain calibration;
   command the switch to the operational position;
   measure and store the known strength test code signal (B) from the known strength test code source in a presence of a jammer power (Jo) based on the jamming signal;
   determine a jamming noise floor based on the known strength test code signal divided by a sum of the jammer power and the RF path gain calibration;
   determine a difference between the jamming noise floor and the bypass noise floor;
   determine a degradation of the desired signal based on the difference; and
   display a jamming condition within a user display operatively coupled with the RF receiver.

2. The system for automatic calibration and jamming measurement of claim 1, wherein the smart antenna assembly further comprises an antenna associated with one of: external to the smart antenna assembly or incorporated within the smart antenna assembly.

3. The system for automatic calibration and jamming measurement of claim 1, wherein command the identification of the new antenna further comprises commanding a response of one of: an antenna part number, an antenna model, an antenna temperature, and a temperature versus a gain profile.

4. The system for automatic calibration and jamming measurement of claim 1, wherein the RF receiver is specifically configured to receive a Global Navigation Satellite System (GNSS) signal.

5. The system for automatic calibration and jamming measurement of claim 4, wherein the desired signal is the GNSS signal.

6. The system for automatic calibration and jamming measurement of claim 1, wherein the interface cable further comprises a coaxial cable configured with a center conductor.

7. The system for automatic calibration and jamming measurement of claim 6, wherein the controller commands the switch to the bypass position via one of: a voltage increase, a voltage decrease, and a short pulse increase or decrease over the center conductor.

8. The system for automatic calibration and jamming measurement of claim 6, wherein the controller commands the switch, the identification, and RF path gain calibration via a low data rate serial communication over the coaxial cable.

9. The system for automatic calibration and jamming measurement of claim 1, wherein the controller commands the switch to revert to the operational position one of: after a time lapse, via transmission of a voltage signature, and wherein the switch reverts to the operational position absent a command from the controller.

10. The system for automatic calibration and jamming measurement of claim 1, wherein the indication prompting entry into a bypass mode further comprises at least one of a controller sensed coupling of a new antenna and a manual calibration commanded by a user.

11. The system for automatic calibration and jamming measurement of claim 1, wherein display a jamming condition further comprises a display of a jamming level including one of: a benign jamming level, a moderated jamming level, an extreme jamming level, and a jamming scale of one to ten, and a transmission of the jamming condition to an additional processor configured for desired signal acquisition and signal tracking.

12. A method for automatic calibration and jamming measurement, comprising:
sensing one of: a power up of a RF receiver and a new antenna coupled to the RF receiver;
commanding an identification of the new antenna;
receiving and storing at least one antenna detail including a temperature gain delta (T) based on a signal from a temperature sensor, a gain (Y) associated with the new antenna, and a cable loss (X) between the new antenna and the RF receiver;
determining an RF path gain, the RF path gain a sum of the gain (Y), the cable loss (X), and the temperature gain delta (T);
receiving an indication prompting entry into a bypass mode of the new antenna;
commanding a switch associated with the new antenna to a bypass position;
measuring and storing a known strength test code signal (B) from a known strength test code source in a presence of a known noise power (No);
determining a bypass noise floor based on the known strength test code signal (B), the known noise power (No), and the RF path gain;
commanding the switch to an operational position;
measuring and storing the known strength test code signal (B) from the known strength test code source in a presence of a jammer power (Jo) based on a jamming signal;
determining a jamming noise floor based on the known strength test code signal (B), the jammer power (Jo), and the RF path gain;
determining a difference between the jamming noise floor and the bypass noise floor;
determining a degradation of a desired signal associated with the new antenna based on the difference; and
displaying the degradation on a user display operatively coupled with the RF receiver.

13. The method for automatic calibration and jamming measurement of claim 12, wherein commanding the identification of the new antenna further comprises commanding a response of one of: an antenna part number, an antenna model, an antenna temperature, and a temperature versus a gain profile.

14. The method for automatic calibration and jamming measurement of claim 12, wherein commanding the switch to the bypass position and operational position is commanded via a voltage increase over an interface cable coupling the new antenna and the RF receiver.

15. The method for automatic calibration and jamming measurement of claim 12, wherein displaying the degradation on the user display further includes a warning of an availability of a desired signal due to jamming, and a modification to a response of the RF receiver to improve a system integrity.

* * * * *